Figure 1:
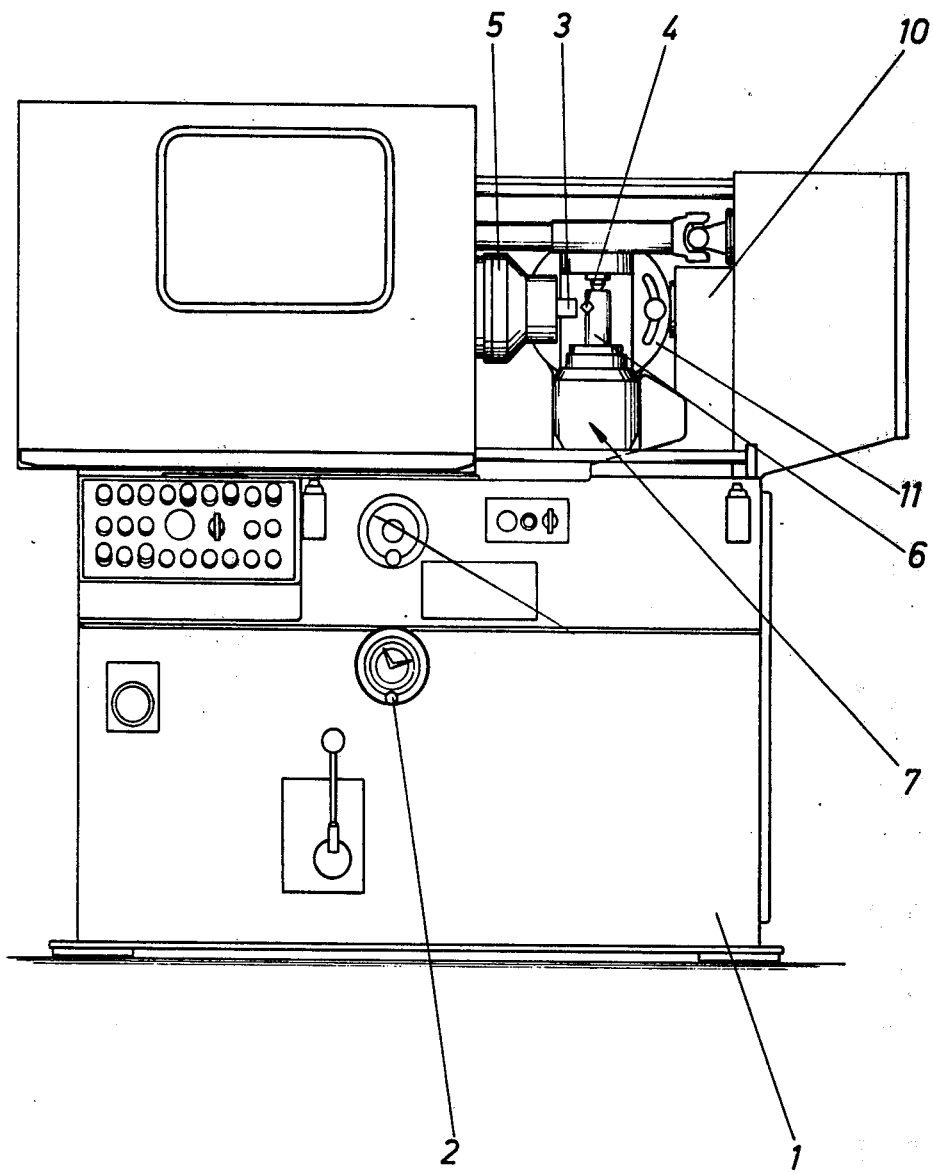

United States Patent [19]

Lieser

[11] 4,164,891
[45] Aug. 21, 1979

[54] MACHINE FOR SIMULTANEOUSLY MILLING OF SEVERAL GROOVES IN ROTATING WORKPIECES

[75] Inventor: Karl Lieser, Wuppertal, Fed. Rep. of Germany

[73] Assignee: Hermann Werner GmbH & Co., Wuppertal, Fed. Rep. of Germany

[21] Appl. No.: 847,547

[22] Filed: Nov. 1, 1977

[30] Foreign Application Priority Data

Nov. 8, 1976 [DE] Fed. Rep. of Germany ....... 2650955

[51] Int. Cl.² .............................................. B23C 3/28
[52] U.S. Cl. ....................................... 409/165; 82/18; 409/38; 409/224
[58] Field of Search ....................... 90/19, 3, 20, 11 R, 90/17, 21 R; 82/18, 19

[56] References Cited

U.S. PATENT DOCUMENTS

| | | | |
|---|---|---|---|
| 1,775,184 | 9/1930 | Abbott | 90/20 |
| 2,689,498 | 9/1954 | Johnson | 82/18 |
| 3,715,956 | 2/1973 | Lieser | 90/20 |

*Primary Examiner*—Horace M. Culver
*Attorney, Agent, or Firm*—Martin A. Farber

[57] ABSTRACT

A machine for simultaneously milling several grooves in rotating workpieces by means of a rotating one-toothed milling tool, whereby the rotational speeds of the milling tool and workpiece stand in a ratio determined by the number of grooves, and whereby the milling tool in the longitudinal direction from the free end of the workpiece—freely-cutting—is plunged in the workpiece which is advanced in the longitudinal movement. The tool carrier is pivotable about an axis lying perpendicularly to the rotational axis of the workpiece such that the rotational plane of the cutter tool is able to be brought in an acute angle relative to the rotational axis of the workpiece.

8 Claims, 5 Drawing Figures

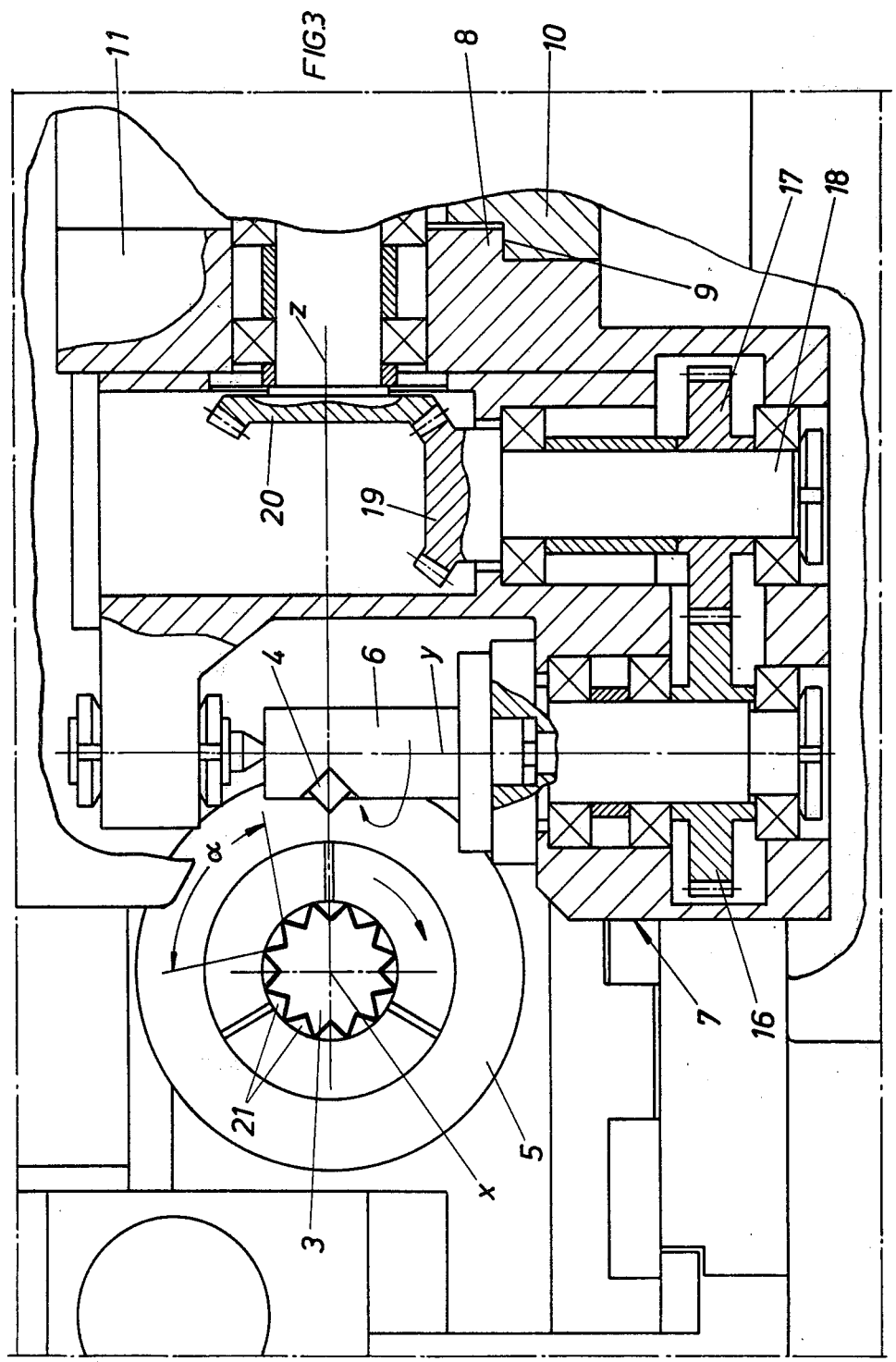

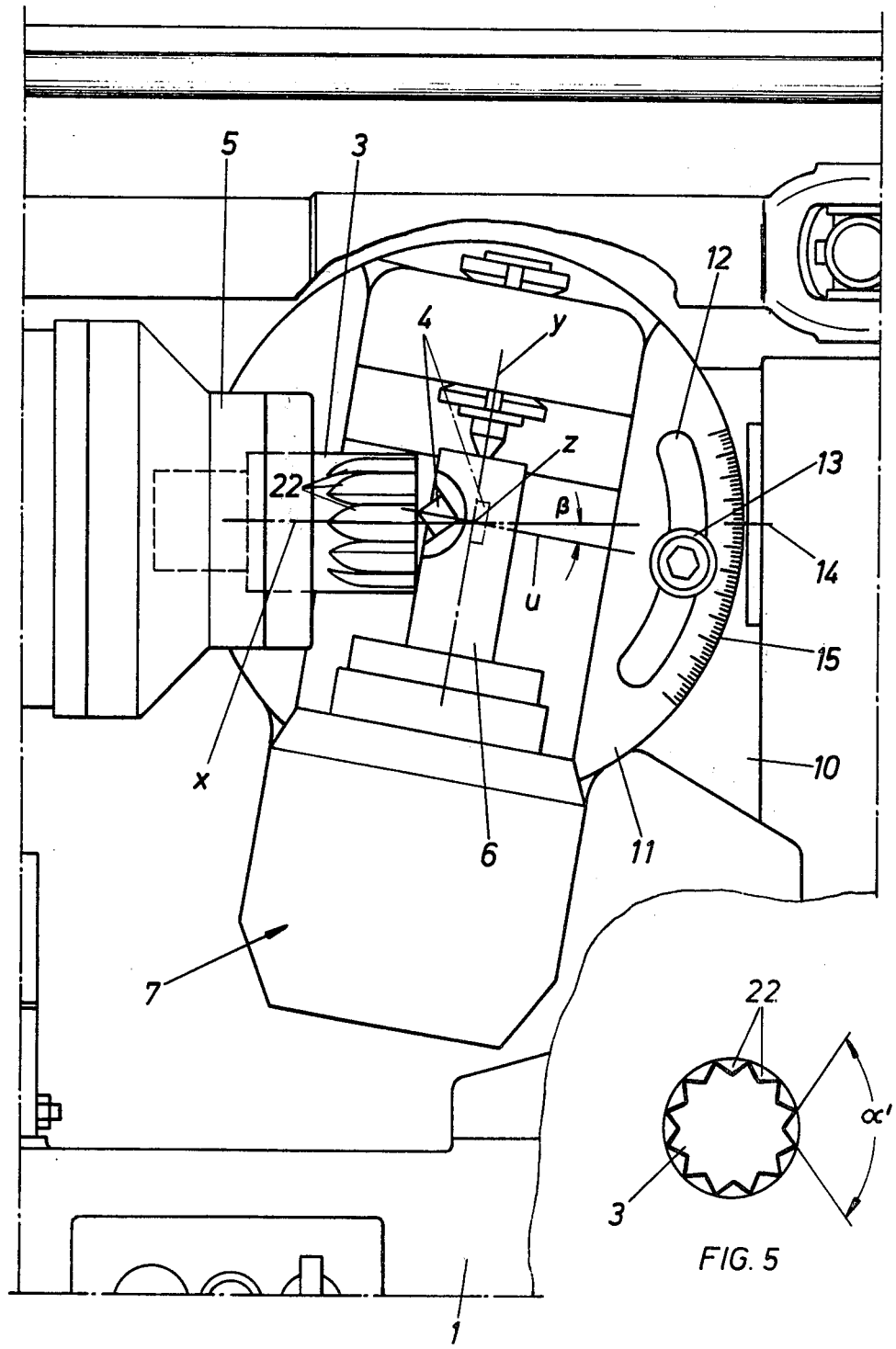

MACHINE FOR SIMULTANEOUSLY MILLING OF SEVERAL GROOVES IN ROTATING WORKPIECES

The invention relates to a machine for simultaneously milling of several grooves in rotating workpieces by means of a rotating one-toothed milling tool or cutter, whereby the speeds of rotation of the milling tool and workpiece stand in a ratio which is determined or set by the number of grooves, whereby the milling tool in the longitudinal direction from the free end of the workpiece—itself free-cutting—plunges in the workpiece which is advanced in the longitudinal feed movement.

This type of machine is known by German Offenlegeschrift OS No. 1 921 514. Dependent upon the free-cutting of the worktool cutter blade or edge a high operating efficiency of the machine is achieved. It can thereby operate with high cutting speeds without the use of cooling means. The grooves which are produced indeed are similar in their geometrical cross-sectional shape to the profile of the cutter tool blade, however they are somewhat enlarged by the free-cutting.

Since the cross-sectional shape of the grooves, in addition to the tool cutting profile, is dependent on the number of tool cutting blades or edges, the diameter of the tool, the workpiece diameter, the division or spacing and the depth of cut, upon changing one of these factors already another profiled cutter tool edge or blade must be selected in order to obtain the same cross-sectional shape of the grooves.

Moreover it is not possible while maintaining the previously named factors to produce different groove shapes by means of one cutter tool blade profile. This likewise requires another worktool cutter edge or blade with another profile.

It is a task of the invention, particularly, i.e., additional to the tasks gathered from the specification and claims, to construct a machine according to the generic type in a simpler manufacturing manner, and advantageous in use, such that on the one hand in spite of a change of the factors which determine the groove profile, grooves are able to be produced which are precisely adjusted or correspond complementarily to the worktool cutter profile, and on the other hand with the same profile of the cutter tool blade without change of the factors, different groove shapes are able to be produced.

This task is solved in accordance with the present invention in the manner that the worktool carrier is pivotable about an axis disposed perpendicularly to the axis of rotation of the workpiece, such that the plane of rotation of the worktool cutter is able to be brought in an acute angle relative to the axis of rotation of the workpiece. As a consequence of such construction a machine of the generic type is produced of increased serviceability. It is particularly suited for production of external spline or spline key profiles, serrations, Hirth type serrations, spline shaft profiles and special shapes. By means of one cutter tool blade of the same profile, in spite of changing the factors that determine the shape of the grooves, grooves can be produced on the workpiece which are precisely adjusted complementary to the cutter tool blade. A change of the factors is compensated merely by horizontally swinging or swiveling of the tool carrier about the corresponding angle. With one single tool blade also different groove shapes may be produced on the workpiece without changing the factors determining the shape of grooves, and indeed likewise by horizontally pivoting or swiveling the tool carrier. As a result of the preceeding a considerable economization of tool costs is brought about. For the purpose of fixing of the pivotal position of the tool carrier, the latter for example can be provided with an arcuate slot, in which a clamping bolt or tightening screw projects. After release of the same, the horizontal swinging is possible, and by tightening, the adjusted inclination position of the tool carrier is secured. These adjustment times are achievable in a short period so that this does not lead to burdens of the economy of the machine. With a shifted or adjusted tool carrier then the plane of rotation of the cutter tool blade lies at an acute angle or point angle with respect to the axis of rotation of the workpiece. The larger the adjustment angle, the larger the groove in its cross-sectional shape, in case the factors which determine the profile of the grooves are not changed. In tests it was established that an adjustment range of 30 degrees in both swinging directions suffices in order to satisfy the requirements which occur. For easier adjustment of the tool carrier, e.g., a scale can serve which cooperates with a fixed mark on the machine. Moreover it may operate with high cutting speeds, so that no efficiency reduction occurs in spite of a tool carrier which stands inclined. By means of the machine in accordance with the invention with a corresponding position of the tool carrier it is indeed possible to produce face-sided coupling-teeth or gearing with negative driver surfaces, which brings about the advantage that both coupling halves are drawn in engagement.

Figure 2:
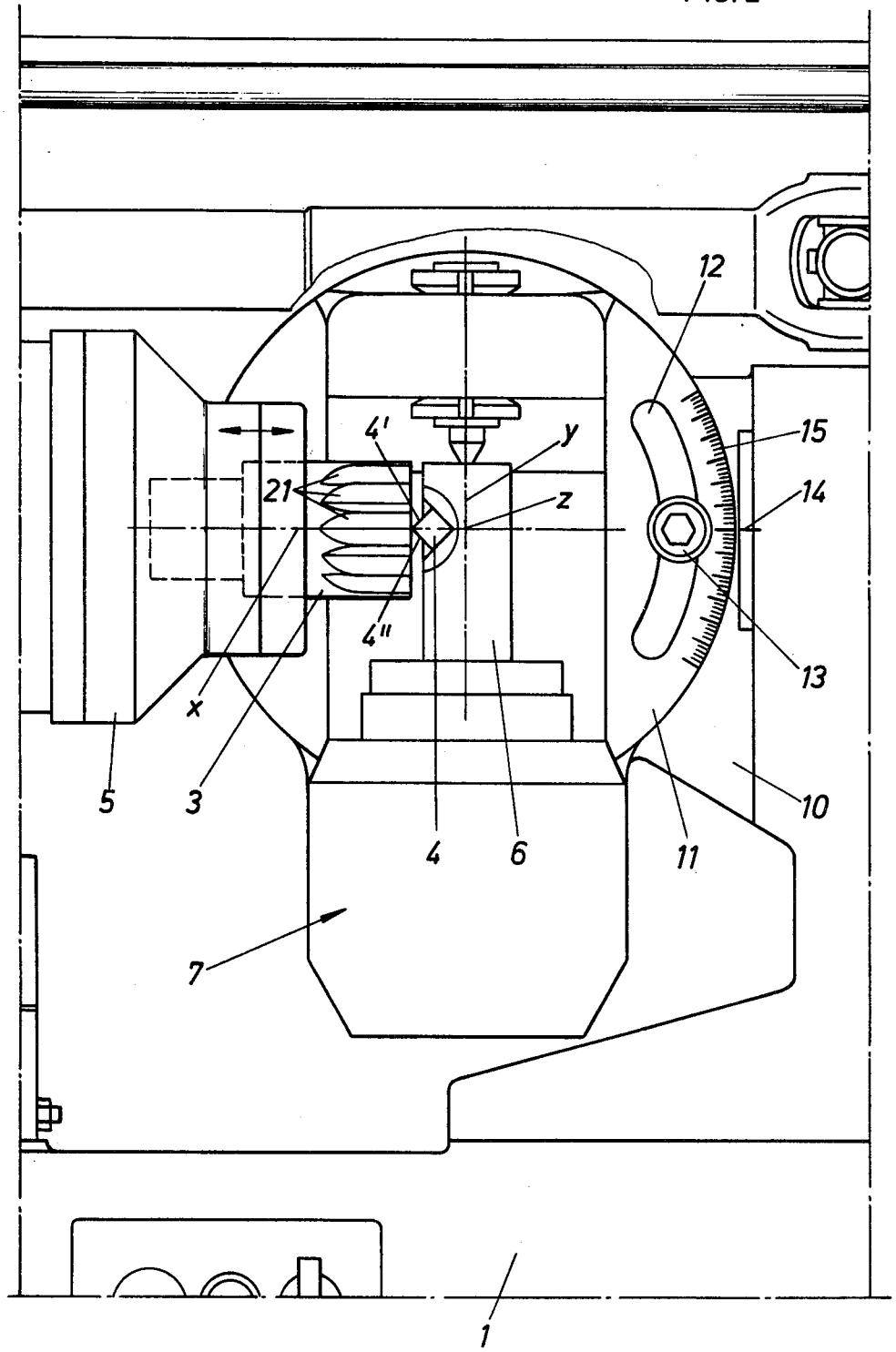

The embodiment example of the invention is explained on the basis of FIGS. 1–5. It shows:

FIG. 1—a view of the machine constructed according to the invention,

FIG. 2—in enlarged cut-out illustration a view in the range of the tool carrier and of the clamping chuck holding the workpiece, FIG. 3—a vertical section through the tool carrier, FIG. 4—an illustration corresponding to FIG. 2, however with the tool carrier adjusted by 10 degrees, and FIG. 5—a front view toward the workpiece with enlarged grooves, the workpiece being finished in this position of the tool carrier.

The machine possesses the pedestal 1, in which the not illustrated mechanical drive is accommodated. By means of the crank handle 2 a stepless or continuous rotational speed adjustment may be provided. By the mechanical drive the workpiece 3 and the tool cutter edge or blade 4 are brought in rotational speeds which are synchronized to one another.

The clamping chuck 5 serves for mounting the workpiece 3. The clamping chuck has a horizontally disposed axis of rotation x.

The cutter tool 4 is secured on the milling shaft 6. The milling shaft 6 is carried by the tool carrier 7. In the normal position of the tool carrier 7, compare FIG. 1 to FIG. 3, the axis y of the milling shaft is vertically aligned to the rotational axis x of the workpiece 3.

The tool carrier 7 is pivotable about an axis z lying perpendicularly to the rotational axis of the workpiece 3. Furthermore the tool carrier forms a collar 8, which projects form-fittingly or complementarily into a bearing recess 9 of the machine-sided bearing block 10. The tool carrier is provided with a flange plate 11. The latter forms an arcuate slot 12 which lies concentric to the axis z of the tool carrier. A clamping screw 13 is inserted through the arcuate slot and is set in the material of the bearing block 10. The arcuate slot 12 extends in the embodiment example starting from a fixed mark 14 of the bearing block 10 in both swinging directions by 30 degrees. For the purpose of easier adjustment of the tool carrier, the flange plate 11 forms a scale 15.

The drive of the milling shaft 6 takes place over the front gears 16 and 17 which are mounted in the tool carrier. The shaft 18 which carries the front gear 17 is equipped with a bevel wheel or conical gear 19 which meshes with the bevel gear 20, the latter coursing about the axis z. As a result of the bevelled or variable drive 19, 20, the rotational drive is also maintained with a horizontally pivoted or swiveled tool carrier 7.

In FIG. 1 to FIG. 3 the tool carrier 7 assumes such a position in which the plane of rotation of the cutter tool 4 is flush in alignment with the rotational axis x of the workpiece 3. The flanks 4', 4" which stand inclined relative to the rotational axis y of the milling shaft 6 thereby produce grooves 21 in the workpiece 3, the angle alpha of which is slightly or insignificantly larger than the angle formed by the flanks 4' and 4". If with the same cutter tool blade 4 grooves 22 with larger angle alpha' are supposed to be finished, the tool carrier 7 is to be shifted or adjusted about its axis z by a corresponding angle. The plane of rotation $\mu$ of the tool cutter 4 then lies at an acute angle beta relative to the rotational axis x of the workpiece 3.

The larger the adjustment angle of the tool carrier 7 is selected, the greater is the angle enclosed by the flanks of the grooves.

On the other hand, an angle of the grooves which corresponds exactly to the profile of the cutter tool 4 is attainable. The tool carrier 7 for this is yet adjusted or shifted and trued by a smaller angle. Moreover a shape of the grooves which is adjusted (complementary) corresponding precisely to the cutter tool profile can be produced when e.g., the workpiece diameter and the division or separation is supposed to change, and indeed again by a corresponding adjustment or shifting of the tool carrier 7.

Instead of the cutter tool blade 4 illustrated in the drawing with flanks 4', 4" meeting at a point, also another tool could be selected, which for example has a trapezoidal-shaped or an involute-shaped profile.

I claim:

1. A machine for simultaneously milling several grooves in rotating workpieces by means of a rotating one-toothed milling tool, wherein the rotational speeds of the milling tool and the workpiece stand in a ratio determined by the number of grooves, wherein the milling tool in the longitudinal direction from the free end of the workpiece is plunged cuttingly in the workpiece which is advanced in a longitudinal movement, the workpiece defining a rotational axis, comprising a tool carrier adapted to carry a cutter tool and operatively rotatably mounted about a first axis, a rotational plane of the cutter tool being defined by rotation of said tool carrier about said first axis, said tool carrier being additionally pivotably mounted about a second axis extending perpendicularly to the rotational axis of the workpiece such that said rotational plane of the cutter tool is able to be brought in an acute angle relative to the rotational axis of the workpiece.

2. The machine as set forth in claim 1, wherein said first axis is perpendicular to the rotational axis of the workpiece in a normal position of said tool carrier.

3. The machine as set forth in claim 2, wherein said second axis perpendicularly intersects the rotational axis of the workpiece.

4. The machine as set forth in claim 2, wherein said second axis intersects said rotational plane of the cutter tool in all pivotal positions of said tool carrier about said second axis.

5. The machine as set forth in claim 4, further including means for adjustably securing said tool carrier in selected pivotal positions about said second axis.

6. The machine as set forth in claim 4, further comprising means for rotatably driving said tool carrier about said first axis in all pivotal positions of said tool carrier about said second axis.

7. The machine as set forth in claim 4, further comprising a bearing block, said tool carrier is pivotally mounted in said bearing block, said tool carrier has a flange plate defining an arcuate slot concentric to said second axis and a scale adjacent said arcuate slot, a clamping screw extends through said arcuate slot and is set into said bearing block, said bearing block has a fixed mark adjacent said scale.

8. The machine as set forth in claim 7, wherein said arcuate slot extends 30 degrees from each side of said fixed mark with respect to said normal position of said tool carrier.

* * * * *